Patented July 25, 1950

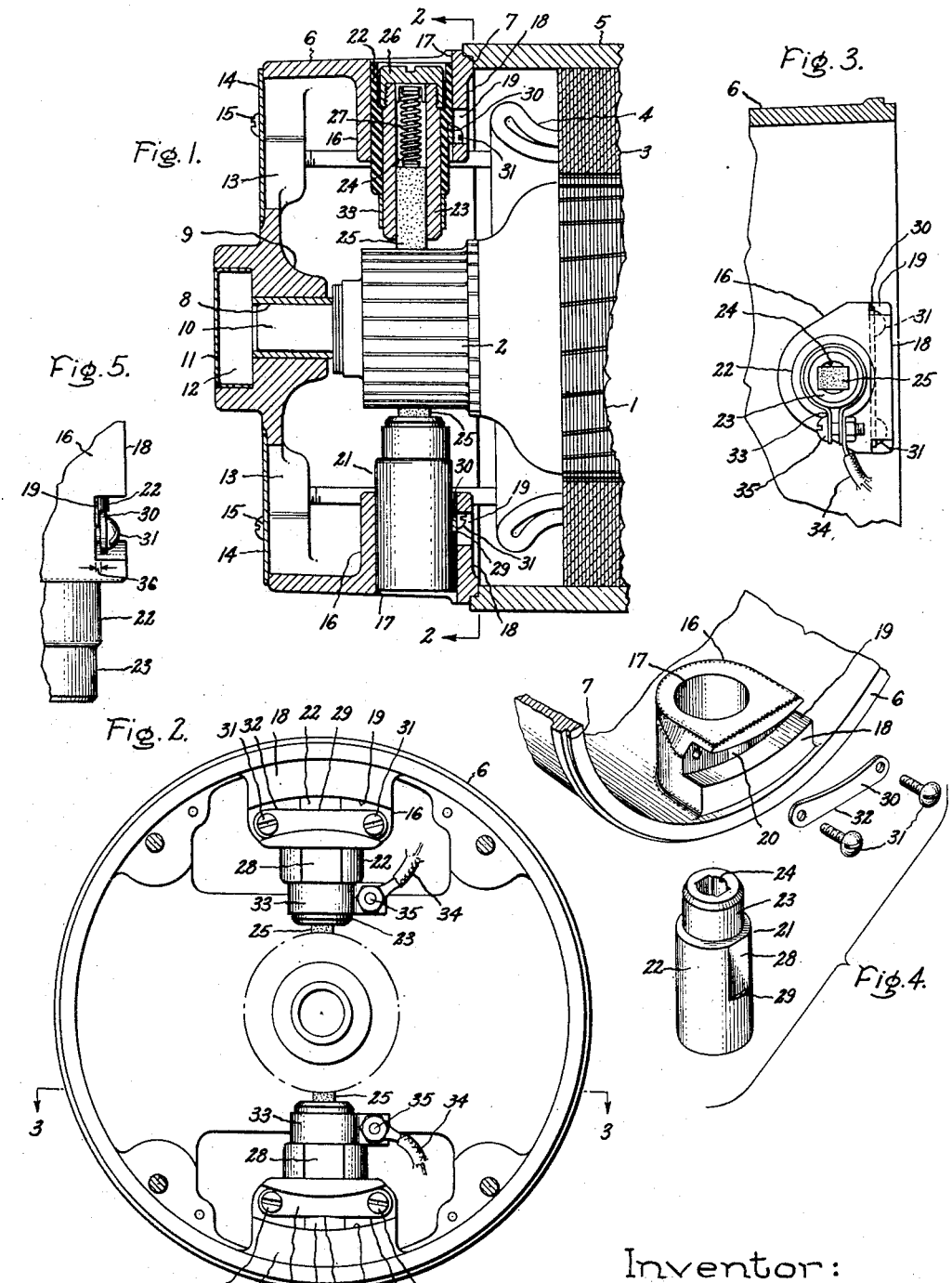
July 25, 1950 — L. W. WIGHTMAN — 2,516,608
BRUSH MECHANISM FOR DYNAMOELECTRIC MACHINES
Filed Dec. 2, 1948
Inventor:
Laurance W. Wightman,
by his Attorney.

2,516,608

UNITED STATES PATENT OFFICE 2,516,608

BRUSH MECHANISM FOR DYNAMO-ELECTRIC MACHINES

Laurance W. Wightman, Fort Wayne, Ind., assignor to General Electric Company, a corporation of New York Application December 2, 1948, Serial No. 63,036

7 Claims. (Cl. 171—324)

This invention relates to brush mechanisms for dynamoelectric machines and more particularly to such mechanisms which are adapted for use with tubular brush holders.

Tubular type brush holders are frequently employed in dynamoelectric machines, particularly the fractional horse power frame sizes. In such machines, difficulty is frequently experienced with the brush holder tubes being pushed into the machine an excessive distance due to an external blow or bump so that the brush holder tube strikes and rubs against the commutator. In addition, the positioning of the inner end of the brush holder tube with respect to the commutator is a factor in successful commutation. Numerous brush holder tube locking devices have been utilized to prevent the brush holder tube from being forced against the commutator, however, these have been complicated and expensive.

An object of this invention is to provide an improved brush holder tube locking mechanism for dynamoelectric machines.

Another object of this invention is to provide an improved brush holder mechanism for tubular type brush holders.

Further objects and advantages of this invention will become apparent and the invention will be better understood from the following description referring to the accompanying drawing, and the features of novelty which characterize this invention will be pointed out with particularity in the claims annexed to and forming a part of this specification.

In accordance with this invention, a brush holder tube mounting protuberance is formed on the inner surface of a dynamoelectric machine end shield or stationary member. A longitudinal brush holder tube-receiving opening is formed through the protuberance and a transverse slot is formed in the surface of the protuberance which communicates with the longitudinal opening. A brush holder tube is provided which is adapted to be positioned in the longitudinal opening and which has a shoulder formed on its end toward the exterior of the machine. A clamping bracket is mounted in the transverse slot in the brush holder tube mounting protuberance. This bracket engages the brush holder tube shoulder preventing the tube from being forced into the machine and restraining twisting of the tube in the longitudinal opening.

In the drawing, Fig. 1 is a side elevational view, partly in section, illustrating the improved brush holder mechanism of this invention; Fig. 2 is an end elevational view taken along the line 2—2 of Fig. 1; Fig. 3 is a vertical view taken along the line 3—3 of Fig. 2; Fig. 4 is a fragmentary exploded view illustrating the assembly of the various components of the improved brush holder mechanism of this invention; and Fig. 5 is a fragmentary side elevational view of the mounting protuberance with the brush holder assembled therein.

Referring now to the drawing, there is shown a dynamoelectric machine having an armature 1 provided with a commutator 2, both of which may be of the conventional type, and a field structure 3 provided with field exciting windings 4. The field structure 3 is mounted in a stationary frame member 5 and an end shield 6 is secured thereto by a suitable rabbet fit, as at 7. A sleeve bearing 8 is mounted in a bearing housing 9 formed integral with the end shield 6. A shaft 10, on which the armature 1 is mounted, is rotatably seated in the sleeve bearing 8 and a cap member 11 is fitted over the opening 12 on the exterior side of the bearing. Openings 13 are provided in the end shield 6 to furnish access to the interior of the machine and these openings are closed by covers 14 secured to the end shield in any suitable manner, as by screws 15.

In order to support the brushes of this machine, the arrangement now to be described is provided. Brush holder protuberances 16 are formed integral with the interior surface of the end shield 6 and project radially inward toward the center of the machine. These brush holder protuberances have a longitudinal brush holder tube-receiving opening 17 formed therein and have a substantially flat surface 18 facing the interior of the machine. The plane of the flat surfaces 18 is at right angles to the axis of the shaft 10. A semi-circular slot or groove 19 is cut or otherwise formed in the flat surfaces 18, this slot being sufficiently deep to communicate with the longitudinal opening 17, as at 20. A brush holder tube assembly 21 is provided comprising an outer cylindrical portion 22 formed of insulating material and an inner cylindrical portion 23 formed of conductive material. The inner portion 23 is provided with a longitudinal groove 24 in which a brush 25 is positioned for longitudinal movement. The upper extremity of the inner brush holder tube portion 23 is threaded to receive a cap member 26. The brush 25 is resiliently urged against the commutator 2 by a spring 27 positioned in the longitudinal slot 24.

In order to prevent the brush holder assembly 21 from being forced into the interior of the machine an excessive distance so that it rubs on the commutator 2, a flat surface 28 is formed on the exterior of the outer brush holder tube portion 22 forming a shoulder 29 toward the end of the brush holder tube assembly remote from the commutator 2. After positioning of the brush holder tube assembly 21 in the longitudinal brush holder tube receiving opening 17, a clamping bracket 30 is positioned in the transverse groove 19 and secured thereto in any suitable manner, as by screws 31. This clamping bracket engages the flat surface 28 of the outer brush holder tube portion 22 preventing it from turning in the longitudinal opening 17 and the upper edge 32 of the bracket engages the shoulder 29 of the outer brush holder tube portion 22 limiting the longitudinal movement of the brush holder tube assembly 21 so that it is prevented from being forced into contact with the commutator 2. After the brush holder assembly 21 is secured in the mounting protuberance 16, as described above, a terminal clamp 33 is secured to the inner brush holder tube portion 23 and the brush lead 34 attached thereto in any suitable manner, as by the screw 35.

The semi-circular slots 19 in the brush holder tube mounting protuberances 16 may be conveniently turned with a radius taken from the axis of the shaft 10. Therefore, all the necessary machining can be performed in one operation, i. e. the machining of the rabbet 7, bearing housing 9, and slots 19. Referring specifically to Fig. 5, the clearance 36 may be provided between the bottom of the slot 19 and the flat surface 28 of the outer brush holder tube portion 22. This clearance allows for machining variations and changes in dimension due to temperature and humidity changes. In practice, screws 31 are pulled tight giving a slight bow in the clamping bracket 30 thus further insuring the tight engagement with the outer brush holder tube portion 22. It will now be readily apparent that this invention provides a simple and inexpensive means for clamping a tubular type brush holder assembly to limit its axial movement so that it cannot be forced into contact with the commutator and to prevent its twisting in the mounting protuberance.

While I have illustrated and described a particular embodiment of this invention, modifications thereof will occur to those skilled in the art. I desire it to be understood, therefore, that this invention is not to be limited to the particular arrangement disclosed, and I intend in the appended claims to cover all modifications which do not depart from the spirit and scope of this invention.

What I claim as new and desire to secure by Letters Patent of the United States is:

1. In combination, a stationary shell member for a dynamoelectric machine having a brush holder tube mounting protuberance formed thereon, said protuberance having a longitudinal brush tube receiving opening formed therein and a transverse slot formed in an outer surface and communicating with said opening, a brush holder tube adapted to be positioned in said opening and having a shoulder formed on its outer surface, and a clamping member adapted to be positioned in said slot and to engage said brush holder tube shoulder for limiting longitudinal movement and restraining turning of said brush holder tube in said opening.

2. In combination, a stationary shell member for a dynamoelectric machine having a brush holder tube mounting protuberance formed on its interior surface, said protuberance having a longitudinal brush tube receiving opening formed therein and a transverse slot formed in an outer surface and communicating with said opening, a brush holder tube adapted to be positioned in said opening and having a shoulder formed on its outer surface on the end toward the exterior of said machine, and a clamping member adapted to be positioned in said slot and having an outer edge adapted to engage said brush holder tube shoulder for limiting longitudinal movement and restraining turning of said brush holder tube in said opening.

3. In combination, a stationary shell member for a dynamoelectric machine having a brush holder tube mounting protuberance formed on its interior surface and projecting radially inward therefrom, said protuberance having a longitudinal brush tube receiving opening formed therein and a semi-circular transverse slot formed in an outer surface and communicating with said opening, a brush holder tube adapted to be positioned in said opening and having a shoulder formed on its outer surface on the end toward the exterior of said machine, and a clamping member adapted to be positioned in said slot and having an outer edge adapted to engage said brush holder tube shoulder for limiting longitudinal movement and restraining turning of said brush holder tube in said opening.

4. In combination, a stationary shell member for a dynamoelectric machine having a brush holder tube mounting protuberance formed on its interior surface and projecting radially inward therefrom, said protuberance having a longitudinal brush tube receiving opening formed therein and a semi-circular transverse slot formed in an outer surface and communicating with said opening, a brush holder tube adapted to be positioned in said opening and having a flat portion on its outer surface forming a shoulder on its end toward the exterior of said machine, and a clamping member adapted to be positioned in said slot to engage said flat portion and having an outer edge adapted to engage said brush holder tube shoulder for limiting longitudinal movement and restraining turning of said holder tube in said opening.

5. In combination, a stationary shell member for a dynamoelectric machine having a brush holder tube mounting protuberance formed on its interior surface and projecting radially inward therefrom, said protuberance having a longitudinal opening formed therein and a substantially flat portion on its outer surface, said protuberance having a transverse slot formed in said flat surface and communicating with said opening, a brush holder tube adapted to be positioned i nsaid opening and having a flat portion on its outer surface forming a shoulder on its end toward the exterior of said machine, and a clamping member adapted to be positioned in said slot to engage said flat portion and having an outer edge adapted to engage said brush holder tube shoulder for limiting longitudinal movement and restraining turning of said brush holder tube in said opening.

6. In combination, a stationary shell member for a dynamoelectric machine having a brush holder tube mounting protuberance formed on its interior surface and projecting radially inward therefrom, said protuberance having a longitudinal brush holder tube receiving opening formed therein and a substantially flat portion on its outer surface, the plane of said flat portion being at right angles to the axis of the shaft of said machine, said protuberance having a semi-circular transverse slot formed in said flat surface and communicating with said opening, the radius of said semi-circular slot being taken from the axis of the shaft of said machine, a brush holder tube adapted to be positioned in said opening and having a flat portion on its outer surface forming a shoulder on its end toward the exterior of said machine, and a clamping member being adapted to be positioned in said slot to engage said flat portion and having an outer edge adapted to engage said brush holder tube shoulder for limiting longitudinal movement and restraining turning of said brush holder tube in said opening.

7. In combination, an end shield for a dynamo-electric machine having a brush holder tube mounting protuberance formed on its interior surface and projecting radially inward therefrom, said protuberance having a longitudinal brush holder tube receiving opening formed therein and a substantially flat portion on its outer surface, the plane of said flat portion being at right angles to the axis of the shaft of said machine, said protuberance having a semi-circular transverse slot formed in said flat surface and communicating with said opening, the radius of said semi-circular slot being taken from the axis of the shaft of said machine, a brush holder tube adapted to be positioned in said opening and having a flat portion on its outer surface forming a shoulder on its end toward the exterior of said machine, and a clamping member adapted to be positioned in said slot to engage said flat portion and having an outer edge adapted to engage said brush holder tube shoulder for limiting longitudinal movement and restraining turning of said brush holder tube in said opening.

LAURANCE W. WIGHTMAN.

REFERENCES CITED

The following references are of record in the file of this patent:

UNITED STATES PATENTS

| Number | Name | Date |
|---|---|---|
| 1,457,896 | Cook | June 5, 1923 |
| 1,751,462 | Baker | Mar. 25, 1930 |

FOREIGN PATENTS

| Number | Country | Date |
|---|---|---|
| 141,892 | Great Britain | Apr. 29, 1920 |
| 151,490 | Great Britain | Sept. 30, 1920 |
| 389,767 | Great Britain | Mar. 23, 1933 |